(12) United States Patent  
Sanocki et al.

(10) Patent No.: US 9,028,690 B2  
(45) Date of Patent: May 12, 2015

(54) WATER TREATMENT CARTRIDGE

(75) Inventors: Stephen M. Sanocki, Hudson, WI (US); Kannan Seshadri, Woodbury, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 353 days.

(21) Appl. No.: 13/450,247

(22) Filed: Apr. 18, 2012

(65) Prior Publication Data

US 2013/0277298 A1    Oct. 24, 2013

(51) Int. Cl.
| | | |
|---|---|---|
| B01D 15/10 | (2006.01) | |
| C02F 1/28 | (2006.01) | |
| C02F 1/42 | (2006.01) | |
| C02F 1/00 | (2006.01) | |

(52) U.S. Cl.
CPC .......... *C02F 1/003* (2013.01); *C02F 2201/006* (2013.01); *C02F 1/283* (2013.01); *C02F 2307/04* (2013.01); *C02F 2001/425* (2013.01)

(58) Field of Classification Search
CPC .... B01D 24/005; B01D 24/045; B01D 27/02; C02F 2307/04; C02F 1/003; C02F 1/283; C02F 2001/425; C02F 2201/004; C02F 2201/006
USPC ......... 210/282, 284, 286, 317, 464, 469, 291, 210/477, 482
See application file for complete search history.

(56) References Cited

U.S. PATENT DOCUMENTS

| | | | |
|---|---|---|---|
| 3,532,158 A | 10/1970 | Hiebert | |
| 4,016,080 A | 4/1977 | Williams | |
| 4,094,779 A | 6/1978 | Behrman | |
| 4,119,019 A * | 10/1978 | Reid | 99/306 |
| 4,448,695 A * | 5/1984 | Gordon et al. | 210/694 |
| 4,605,499 A | 8/1986 | Wise | |
| 4,764,274 A * | 8/1988 | Miller | 210/232 |
| 4,814,081 A | 3/1989 | Malinowski | |
| 4,999,109 A | 3/1991 | Sabre | |
| 5,225,078 A | 7/1993 | Polasky | |
| 5,562,824 A | 10/1996 | Magnusson | |
| 5,595,659 A | 1/1997 | Huang | |
| 5,652,008 A * | 7/1997 | Heiligman | 426/422 |
| 6,039,780 A | 3/2000 | Hummel | |
| 6,051,137 A | 4/2000 | Deskins | |
| 6,290,848 B1 * | 9/2001 | Tanner et al. | 210/266 |
| 6,475,386 B1 | 11/2002 | Carr | |
| 7,291,266 B2 * | 11/2007 | Takashima et al. | 210/266 |
| 7,854,848 B2 | 12/2010 | Olson | |
| 7,871,528 B2 * | 1/2011 | Aregger et al. | 210/807 |
| 8,465,650 B2 * | 6/2013 | McCague et al. | 210/687 |
| 2003/0047523 A1 | 3/2003 | Gannon | |

(Continued)

FOREIGN PATENT DOCUMENTS

| | | |
|---|---|---|
| GB | 2198053 | 6/1988 |
| JP | 2071810 | 3/1990 |

(Continued)

OTHER PUBLICATIONS

International Search Report for PCT/US2013/033741, prepared by the Korean Intellectual Property Office, mailed on Jul. 1, 2013.

*Primary Examiner* — Matthew O Savage  
(74) *Attorney, Agent, or Firm* — David B. Patchett; Scott A. Baum

(57) ABSTRACT

A manually-operated gravity-flow water treatment cartridge for use in a portable water treatment device having a filtered water reservoir includes a housing comprising a framework defining a plurality of compartments that contain solid particulate water treatment media loosely arranged therein.

18 Claims, 2 Drawing Sheets

(56) References Cited

U.S. PATENT DOCUMENTS

| | | |
|---|---|---|
| 2005/0003060 A1 | 1/2005 | Steenhof |
| 2005/0023211 A1 | 2/2005 | Koslow |
| 2010/0006508 A1* | 1/2010 | Mitchell et al. ............... 210/669 |
| 2010/0176037 A1 | 7/2010 | Namespetra |
| 2010/0296877 A1 | 11/2010 | Durkheim |
| 2010/0320150 A1 | 12/2010 | Dagesse |
| 2011/0000841 A1* | 1/2011 | Rusinov et al. ............... 210/282 |
| 2011/0006007 A1 | 1/2011 | Kuruc |
| 2012/0009569 A1 | 1/2012 | Kshirsagar |
| 2012/0055862 A1 | 3/2012 | Parekh |
| 2013/0175228 A1* | 7/2013 | Utsch et al. ................... 210/767 |

FOREIGN PATENT DOCUMENTS

| | | |
|---|---|---|
| JP | 4-358597 | 12/1992 |
| JP | 6-218386 | 8/1994 |
| JP | 8-132021 | 5/1996 |
| JP | 9-070511 | 3/1997 |
| JP | 2001-079421 | 3/2001 |
| JP | 2002-214377 | 7/2002 |
| JP | 2004-358425 | 12/2004 |
| JP | 2009-168413 | 7/2009 |
| WO | WO 2010-118112 | 10/2010 |
| WO | WO 2011-156255 | 12/2011 |

\* cited by examiner

WATER TREATMENT CARTRIDGE

BACKGROUND

The present disclosure relates generally to water treatment, and, more particularly, to a water treatment device, such as a water pitcher or water bottle, and a water treatment cartridge that is used to treat tap water in such a water treatment device.

Gravity-fed water filtration devices for filtering domestic tap water are known in the prior art. U.S. Pat. No. 5,225,078 (Polasky, et. al.), for example, discloses a pour-through pitcher filter assembly including a compact filter element including a thin annular disk of molded activated carbon and a peripheral annular seal element.

SUMMARY

Known gravity-fed water filtration devices have filters with low flow rates and limited filtering capability. That is, the rate at which water can flow through such filter media is undesirably low, and the type of contaminants such filters can remove from the water is limited both in terms of the types of contaminants that can be removed as well as the quantity of the contaminants that can be removed. Such filters also tend to be large and, therefore, occupy a significant portion of the device's holding capacity. Thus, such filters either increase the size of the device or limit the storage capacity of the device. In addition, such filters are generally difficult and/or expensive to make, and cannot be easily tailored to meet the demands of a particular unfiltered water supply.

The need exists for a water treatment device, and for a water treatment cartridge for use in a water treatment device, that overcomes the drawbacks and shortcomings of known water filter devices. In particular, the need exists for a water treatment device having a water treatment cartridge having improved flow rates and enhanced filtering capability. That is, it would be desirable to provide a water treatment cartridge that has a higher flow rate than conventional water filters, and has enhanced filtering capability both in terms of the types of contaminants it can remove, as well as the overall quantity of contaminants it can remove. In addition, it would be desirable to provide a water treatment cartridge that is compact, and therefore occupies less of the container volume and allows for the design of more compact water treatment devices. It would also be desirable to provide a water treatment cartridge that can be produced easily, affordably, and can be readily tailored to meet the treatment demands of a particular water supply depending on the quality of the input water supply.

In one embodiment, the present disclosure provides a manually-operated gravity-flow water treatment cartridge for use in a portable water treatment device having a filtered water reservoir. The water treatment cartridge comprises a housing configured for removable arrangement in the water treatment device. The housing comprises a framework defining a plurality of cells or compartments, and solid particulate water treatment media is loosely arranged in each of the compartments.

In a more specific aspect, the housing may comprise a side wall extending around the perimeter of the framework, and the housing may comprise retaining members arranged adjacent opposite sides of the framework. The retaining members serve to retain the water treatment media within the compartments, and do not significantly impede the flow of water through the cartridge.

In one aspect, the housing includes an inlet side and an outlet side, and the housing may comprise a flow regulating member arranged adjacent at least one of the inlet and outlet sides. The flow regulating member may be, for example, a scrim, screen, nonwoven or woven cloth material arranged over the entire outlet side of the housing, and restricts the flow of water through the solid particulate water treatment media thereby increasing the amount of time the water is in contact with the solid particulate water treatment media and the flow rate of water through the water treatment cartridge at a pressure head of ¾ inch (1.9 cm) of water is at least about 0.03 liters per minute (lpm) and no greater than about 5.0 lpm at a pressure head of 2 inches (5.1 cm) of water.

In a more specific aspect, the flow regulating member may restrict the flow of water through the water treatment media to no greater than about 2 liters per minute per 100 square centimeters (2 lpm/100 $cm^2$) of water treatment surface area. In another aspect the water treatment cartridge passes NSF Standard 42 for a capacity of at least about 302 liters (80 gallons).

In one embodiment, the flow regulating member may comprise a fibrous nonwoven material. The flow regulating member may further comprise activated carbon particles incorporated into the fibrous nonwoven material. In various aspects, the solid particulate water treatment media may comprise a combination of ion exchange resin and activated carbon, the activated carbon may have an average particle size of at least about 30 um and no greater than about 800 um, and/or each compartment may contain less than about 80% water treatment media by volume when the water treatment media is in its dry condition.

In other specific aspects, the inlet side of the housing may have a water treatment surface area of at least about 20 $cm^2$ and no greater than about 250 $cm^2$, the distance between the inlet side of the housing to the outlet side of the housing may define a flow path having a length of at least about 0.65 cm and no greater than about 5 cm, each compartment may have a volume of at least about 0.25 $cm^3$ and no greater than about 10 $cm^3$, the housing may have a thickness to cross-sectional area ratio of at least about 0.005 and no greater than about 0.05, and/or the flow rate of water through the water treatment cartridge at a pressure head of ¾ inch (1.9 centimeters) of water may be at least about 0.03 liters per minute (lpm) and no greater than about 5.0 lpm at a pressure head of 2 inches (5.1 centimeters) of water.

In other aspects, the housing may be an injection molded thermoplastic polymer, or the housing may be formed of an expanded off-set bonded film, whereby strips of film bonded together create compartments when they are expanded. Each compartment may have a hexagonal cross-sectional shape, thereby forming a framework having honeycomb-shaped structure.

In another embodiment, the present disclosure provides a water treatment cartridge comprising a housing containing a plurality of compartments, wherein each compartment contains solid particulate water treatment media, and a flow regulating member arranged to restrict the flow of water through the water treatment media.

In yet another embodiment, the present disclosure provides a water treatment device comprising a container defining a reservoir, a water treatment cartridge configured for removable arrangement in the reservoir, wherein the water treatment cartridge comprises a housing comprising a framework defining a plurality of compartments, a side wall extending around the perimeter of the framework, an open scrim arranged adjacent opposite sides of the framework, a nonwoven web arranged to restrict the flow of water through the water treatment media, and solid particulate water treatment media comprising at least activated carbon and ion exchange resin is loosely arranged in each of the compartments.

Advantages of certain embodiments of the water treatment cartridge described herein include, for example, that it has a flexible, versatile, and/or adaptable design that can be easily tailored or customized for different end use applications. For example, the water treatment cartridge can be readily configured for use in water treatment devices having different sizes and shapes, and the water treatment media can be customized to treat water supplies containing different contaminants or have different treatment requirements. In addition, in certain embodiments, the water treatment cartridge may have a high flow rate. This allows the water treatment cartridge to have a thin, low profile, or otherwise compact design that occupies less volume of the water treatment device. Thus, the size of the water treatment device can be reduced without reducing the holding capacity of the device, or a device of a given size can have a greater storage capacity. In addition, certain embodiments lend themselves to flexible manufacturing processes.

BRIEF DESCRIPTION OF THE DRAWINGS

The present disclosure will be further described with reference to the accompanying drawings, in which.

DETAILED DESCRIPTION

Figure 2:
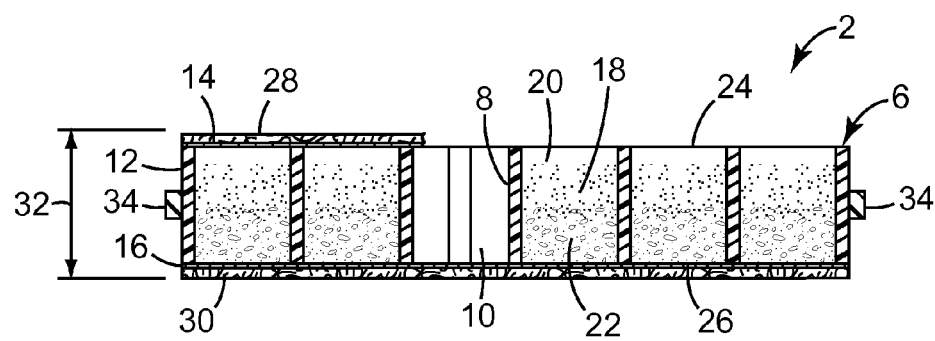
FIG. 2 is a cross-sectional view taken along line 2-2 of FIG. 1.
Figure 3:
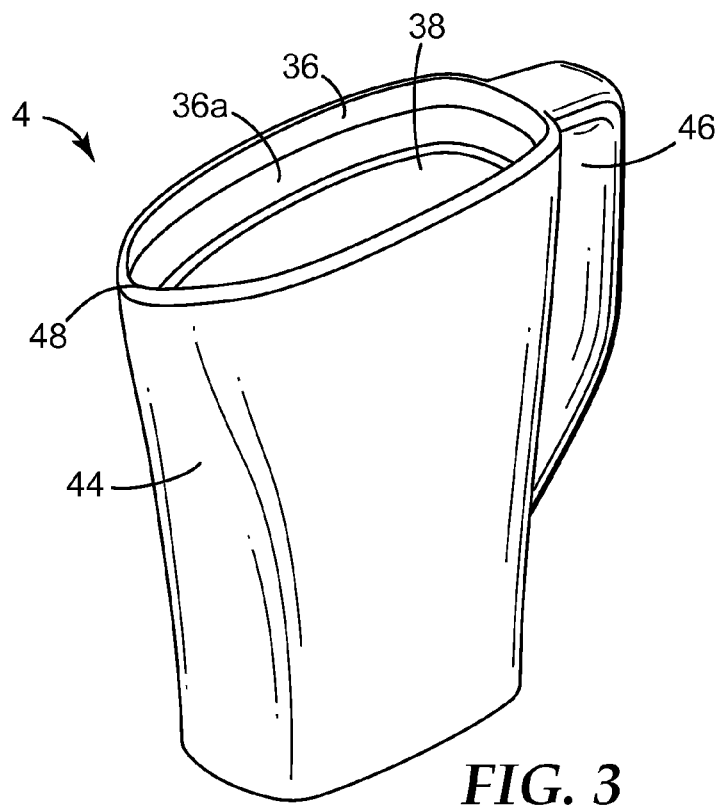
FIG. 3 is a perspective view of a water pitcher adapted to receive a water treatment cartridge according to an embodiment of the invention.
Figure 4:
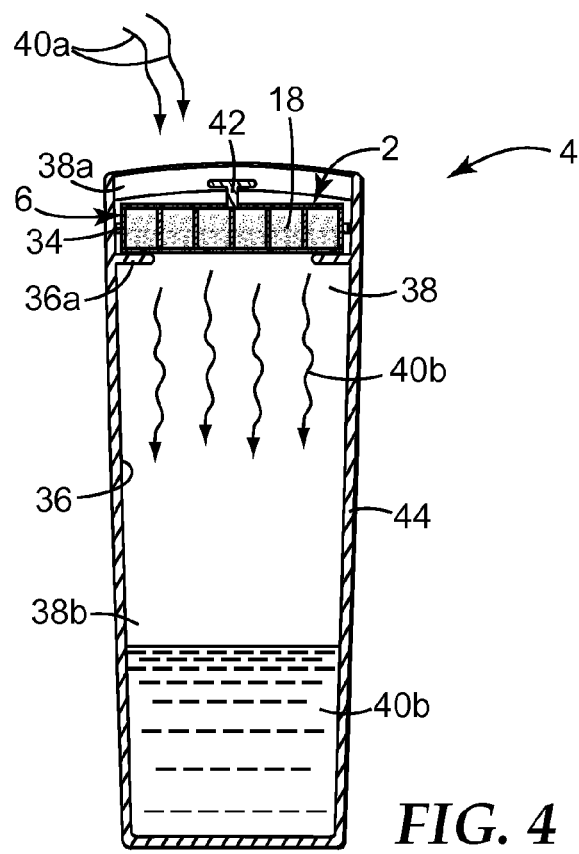
FIG. 4 is a cross-sectional view of the water pitcher of FIG. 3 with a water treatment cartridge installed therein.

Referring now to the drawings, wherein like reference numerals refer to like or corresponding features or parts throughout the several views, FIGS. 1-4, shows a gravity-flow water treatment cartridge 2 configured for removable arrangement within a manually-operated water treatment device 4 (FIG. 4). In one aspect, the water treatment device 4 is freestanding and portable. That is, the device 4 is not plumbed, or connected directly to a water source, and is not mounted or installed at a particular location. Rather, the treatment device 4 may be readily moved from one location to another. "Gravity-fed" generally refers to allowing the unfiltered water to flow freely through the water treatment cartridge 2. That is, the unfiltered water is not pressurized, and the only pressure acting on the water as it passes through the water treatment cartridge 2 is the pressure resulting from the incoming flow of the water and pressure resulting from gravity. In the illustrated embodiment, the water treatment device 4 is a water pitcher. In other embodiments, the water treatment device may be, for example, a carafe, water bottle, cup, pot, or any vessel configured to receive a suitably shaped cartridge.

Figure 1:
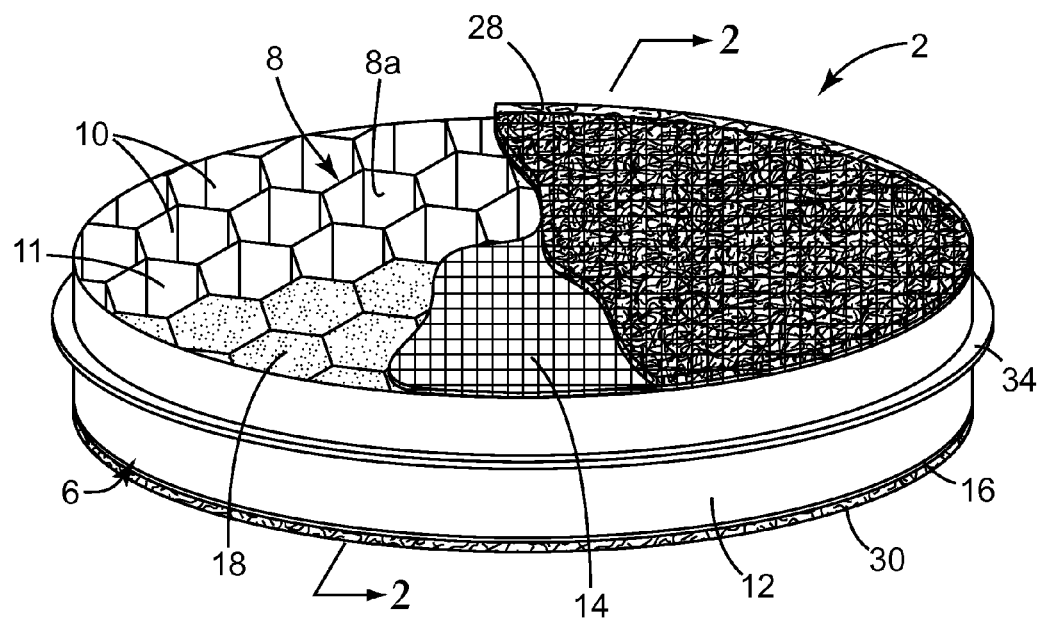
FIG. 1 is a partially cutaway perspective view of a water treatment cartridge according to an embodiment of the invention.

Referring to FIGS. 1 and 2, the water treatment cartridge 2 includes a housing 6 having an internal grid or framework 8 that defines a plurality of cells or compartments 10, an outer side wall 12 extending around the perimeter of the framework 8, first and second media retaining members 14, 16 arranged on opposite sides of the housing 6, optional upstream and downstream flow regulating members 28, 30 arranged on opposite sides of the first and second media retaining members 14, 16, respectively, and particulate water treatment media 18 arranged within the compartments 10. For illustrative purposes, upstream flow regulating member 28 is shown in FIG. 1 as partially cutaway to more clearly reveal the underlying first retaining member 14, framework 8, and water treatment media 18.

In the illustrated embodiment, the housing 6 has a generally oval shape. Housings having other sizes and shapes, such as circular, square, or rectangular, are contemplated. The size and shape of the housing 6 may depend, for example, on the size and shape of the opening in the water treatment device 4.

In the illustrated embodiment, the framework 8 includes walls or partitions 8a that define a honeycomb-like structure, and each compartment 10 is columnar and hexagonal in shape. That is, each compartment 10 in the illustrated embodiment is in the shape of a slightly elongated hexagonal prism. Frameworks and compartments having other sizes, shapes and structures are contemplated. For example, the framework 8 may include a rectilinear grid, a grid formed of linear partitions and concentric circles, or the framework 8 may have an irregular pattern. The compartments 10 may have openings 11 in the shape of, for example, squares, rectangles, triangles, ovals, circles, or combinations of such shapes. The corresponding upstream and downstream openings 11 of each compartment 10 may have identical sizes and shapes, or they may be different. For example, the upstream openings may be larger than the downstream openings. In addition, the partitions 8a may include features to promote mixing or otherwise create turbulence as water flows through the compartments 10, thereby to increase the interaction between the water and the particulate water treatment media 18.

In one embodiment, the housing 6 may be formed of a synthetic plastic material such as polypropylene. The housing 6 may be formed in a variety ways. In one embodiment, the housing 6 may be formed by injection molding a thermoplastic polymeric material, or by extrusion, whereby a thermoplastic polymeric material is extruded through a die and cut into slices to produce housings having the desired thickness. The housing 6 may also be formed from an expanded off-set bonded film. In this process, strips of film are bonded together at regular off-set intervals, and the compartments 10 are formed when the film is expanded. The housing 6 can be made by other methods, such as using a form-in-place thermosetting material, by stereolithography, 3-D prototyping, or machining from a plastic blank.

Solid water treatment media 18 is loosely arranged in each of the compartments 10. The particular water treatment media 18 selected is not particularly significant so long as it provides the desired function. In one embodiment, the water treatment media 18 comprises particulate, granular or bead-like water treatment media. Suitable water treatment media includes, for example, activated carbon or an ion exchange resin. A suitable granular activated carbon material is available under the trade designation 150 MP from Kuraray Chemical Company, Osaka, Japan. A suitable ion exchange resin is WACG (weak acid cation exchange gel) available from Resintech, Inc., West Berlin, N.J., USA.

As shown in the embodiment illustrated in FIG. 2, the water treatment media 18 may comprise a combination of activated carbon water treatment media 20 and ion exchange resin 22. The activated carbon 20 and ion exchange resin 22 may be mixed generally uniformly within each compartment 10, or the activated carbon 20 and ion exchange resin 22 may be arranged as somewhat separate layers within each compartment 10. In a specific embodiment, the water treatment cartridge 2 includes an inlet side 24 and an outlet side 26, and within each compartment 10, the activated carbon particles 20 are arranged predominantly adjacent the inlet side 24 of the water treatment cartridge 2, and the ion exchange resin beads 22 are arranged predominantly adjacent the outlet side 26 of the water treatment cartridge 2. Arranged in this matter, unfiltered water passing through the compartment 10 will first flow through the activated carbon treatment media 20 and will then flow through the ion exchange treatment media 22.

In another embodiment, the water treatment cartridge 2 may comprise a plurality of separate layers each containing a single type of water treatment media 18, and the layers may be combined, or stacked on top of each other, to form a composite water treatment cartridge. In this manner, the treatment cartridge 2 can be readily tailored to a specific end-use application. This is desirable because the type of water treatment needed, and degree of water treatment needed, for a given supply of unfiltered water may vary depending on the quality of the water supply.

In specific embodiments, the activated carbon may have an average particle size of at least about 20 µm, at least about 30 µm, or at least about 40 µm, and an average particle size of no greater than about 800 µm, no greater than about 600 µm, no greater than about 400 µm, or no greater than about 200 µm. In other embodiments, the ion exchange resin has an average particle size of at least about 60 µm, at least about 100 µm, or at least about 200 µm, and an average particle size of no greater than about 1000 µm, no greater than about 800 µm, no greater than about 600 µm, or no greater than about 400 µm. To allow for the expansion of the ion exchange resin 22 in water, each compartment 10 may contain less than about 85%, 80%, 75% or 70% of water treatment media by volume when the water treatment 18 media is in its dry condition. That is, at least 15%, 20%, 25% or 30% of the volume of each compartment 10 may be left empty prior to use to allow the ion exchange resin to expand during use. The dry condition of the ion exchange resin refers to the condition of the water treatment media 18 under ambient conditions. The dry condition may include residual moisture from, for example, humidity in the air.

The activated carbon particles 20 may be fabricated using a variety of techniques and may be treated so they are capable of removing contaminants present in water. Such contaminants include, for example, disinfection related contaminants and disinfection byproducts (e.g., chlorine, chloramines, hypochlorite, haloalkanes (such as trihalomethanes), haloacids, chlorites, chlorates and perchlorates, nitrates and nitrites), as well as organic humic acid compounds and derivatives resulting from natural decomposition of vegetative matter, The ion exchange resin 22 may include a macroporous resin or a gel. The ion exchange resin 22 is chemically configured so as to be able to remove, among other things, multivalent cations, heavy metals, arsenic compounds, nitrogen containing compounds such as nitrates, radionuclides such as radium, lead and lead compounds. More generally, the ion exchange resin 22 resin is configured to have an affinity for compounds generally regarded as pollutants or contaminants as may be found in typical drinking water or well water that can be removed by such means. Different ion exchange resins may also be used in combination to selectively remove undesirable contaminants from the water. Selection of the appropriate ion exchange resin will depend, in part, on the nature and quality of the water to be treated. Ion exchange resins may be used, for example, to remove undesirable metal ions, such as copper, lead or cadmium, from the water, replacing them with more innocuous ions, such as sodium and potassium.

In addition to ion exchange resins and activated carbon, other active media may be utilized. These may include, for example, chelating agents and particles comprised of inorganic salts, such as aluminosilicates and zeolites. Other active media include particles that contain chelating moieties and affinity ligands that have a specific interaction with a specific contaminant. Other substances have surface active sites, such as Lewis acid and base sites that may provide for acid-base interactions between the contaminant and the substance, or hydrogen bonding interaction.

In addition to particulate water treatment media, other types of water treatment media may be incorporated into the water treatment cartridge 2. For example, formed-in-place media, such as monoliths, may be used. With such media, each compartment 10 may be filled with functional and crosslinking monomers, and the monomers may be reacted using suitable means. In this manner, the functional monomers will contain functional moieties that are chemically similar to those present in the particulate media described above. The production of monoliths is described in, for example, "Monolithic Materials: Preparation, Properties and Applications (Journal of Chromatography Library), eds. F. Svec, T. B. Tennikova and Z. Deyl, (2003).

The media retaining members 14, 16 are arranged to retain the water treatment media 18 in the compartments 10 of the housing 6. The retaining members 14, 16 are not intended to significantly impede the flow of water through the housing 6. Accordingly, water readily flows through the retaining members 14, 16, and the water treatment media 18 is held within the compartments 10. To retain the water treatment media 18 in the compartments 10, the retaining members 14, 16 are arranged over the entirety of both the inlet side 24 and outlet side 26 of the housing 6. The retaining members 14, 16 may comprise, for example, a scrim, screen, a nonwoven material, such as a fibrous media, or woven material, such as cloth. The scrim may be formed of, for example, a synthetic hydrophilic plastic material, such as a spunbond nylon or a hydroentangled web prepared either from a spunbond thermoplastic web, or a web carded from suitable staple fibers. Suitable screens may be fabricated from, for example, thermoplastic synthetic materials, or woven from another suitable material, such as a metal. Suitable screens may be characterized by certain features, such as mesh size or fiber diameter, which may be selected by those skilled in the art to generally retain the particulate media within the compartments 10 while still allowing water to readily flow through the water treatment cartridge 2.

In accordance with one aspect of the water treatment cartridge 2, the water treatment cartridge 2 may include an optional upstream flow regulating member 28 arranged adjacent the inlet side 24 of the housing 6. In FIG. 1, the upstream flow regulating member 28 is shown partially cutaway to allow the underlying media retaining member 14, the housing 6, and the water treatment media 18 to be readily seen. Alternatively, or in addition to, the upstream flow regulating member 28, a downstream flow regulating member 30 may be provided adjacent the outlet side 26 of the housing 6. It will be recognized that in some embodiments, one or both of the retaining members 14, 16 may also serve as a flow regulating member 28, 30. In this case, it will be recognized that the first retaining member 14 and the upstream flow regulating member 28 may be combined, and the second retaining member 16 and the downstream flow regulating member 30 may be combined. That is, separate retaining members 14, 16 and flow regulating members 28, 30 are not required. The flow regulating members 28, 30 may comprise, for example, a scrim, screen, nonwoven or cloth material. In one embodiment, the flow regulating members 28, 30 may comprise a fibrous nonwoven material.

In a more specific embodiment, the flow regulating members 28, 30 may further comprise particles, such as activated carbon particles, that are incorporated into the fibrous nonwoven material. In other embodiments, the retaining members 14, 16 and/or flow regulating member 28, 30 may include treatment particles or other water treatment material. In a specific embodiment, the retaining members 14, 16 and/or flow regulating member 28, 30 may be particle loaded nonwoven webs. Suitable treatment particles include, for example, inorganic particles such as amorphous magnesium silicate (e.g., CM-111 Cosmetic microspheres, available from 3M Company, St. Paul Minn.) or those in Metsorb HMRG available from Graver Technologies Inc, Newark, N.J. Construction of such fibrous meltblown polymeric nonwoven materials are described in PCT Publication WO 2010/118112 A2 (Wolf et. al.), which is hereby incorporated by reference in its entirety. As explained in WO 2010/118112 and applied herein, a web is filtration media of an open-structured entangled mass of fibers, for example, microfibers. A fibrous nonwoven web may comprise polymeric meltblown fibers. Should sorbent material in the form of particles, particulates, and/or agglomerates or blends be desired, they may be added to an airstream forming the web, which attenuates the polymeric meltblown fibers and conveys these fibers to a collector. The particles become enmeshed in a meltblown fibrous matrix as the fibers contact the particles in the mixed airstream and are collected to form a web. Sorbent materials include, but are not limited to, types of materials that change physical or chemical properties of a fluid such as absorbent and adsorbent materials and materials having surface activity. Examples of sorbents may include, but are not limited to, granular and powdered activated carbon; ion exchange resin; metal ion exchange zeolite sorbents such as Engelhard's ATS; activated aluminas such as Selecto Scientific's Alusil; antimicrobial compounds, for example silver, zinc and halogen based materials; acid gas adsorbents; arsenic reduction materials; iodinated resins; titanium oxide; titanium hydroxide; and diatomaceous earth. Reference to "enmeshed" means that particles are dispersed and physically held in the fibers of the web. Generally, there is point and line contact along the fibers and the particles so that nearly the full surface area of the particles is available for interaction with fluid. Particle sizes and morphologies of these exemplary materials can be adjusted by those skilled in the art to be suitable for a particular end use application.

In addition to particle loaded webs as described above, other flow regulating members 28, 30 may be provided. For example, a wet-laid material, which can be produced by processes similar to those employed in papermaking, may be used. One such wet-laid material comprises particles trapped in a porous polymeric fiber matrix as described in PCT Publication WO 2011/156255 (Damte et. al.). Another example is sintered polymeric materials such as those described in US Patent Application Publication Nos. 2011/0006007 (Kuruc et. al.) and 2012/0009569 (Kshirsagar et. al.).

The flow regulating members 28, 30 are used to define or control the flow rate of water through the water treatment media 18, whereby the degree of water treatment can be optimized. That is, one or more flow regulating members 28, 30 can be used to restrict, or slow, the flow of water through the water treatment media 18, thereby to increase the amount of time the water is in contact with the water treatment media 18. In one embodiment, at least one flow regulating member 28, 30 is provided, and the flow regulating member serves to restrict the flow of water through the water treatment media 18 to no greater than about 2 liters per minute per 100 square centimeters (2 lpm/100 $cm^2$) of water treatment surface area.

The "water treatment surface area" refers to the combined area of the upstream openings of the compartments 10. That is, if each compartment 10 has an upstream opening having an area of 1 $cm^2$, and water treatment cartridge 2 has fifty compartments 10, then the water treatment surface area would be 50 $cm^2$. In one embodiment, the inlet side 24 of the housing 6 has a water treatment surface area of at least about 20 $cm^2$, at least about 40 $cm^2$, or at least about 60 $cm^2$, and a water treatment surface area of no greater than about 250 $cm^2$, no greater than about 200 $cm^2$ or no greater than about 150 $cm^2$.

In other aspects, the distance from the inlet side 24 of the housing 6 to the outlet side 26 of the housing 6 defines a flow path 32, and the flow path 32 has a length of at least about 0.2 cm, at least about 0.4 cm, or at least about 0.6 cm, and a length of no greater than about 7 cm, no greater than about 5 cm, or no greater than about 3 cm.

In another aspect, each compartment 10 has a volume of at least about 0.25 $cm^3$, at least about 0.5 $cm^3$, or at least about 1.0 $cm^3$, and a volume of no greater than about 10 $cm^3$, no greater than about 7 $cm^3$, no greater than about 4 $cm^3$. In another aspect, the ratio of the flow path length 32 to the average cross-sectional area of the compartments is at least about 0.25, at least about 0.5, or at least about 0.87, and a ratio of the flow path length to the average cross-sectional area ratio of the compartments is no greater than about 20, no greater than about 10, or no greater than about 5. In another aspect, the ratio of the thickness of the housing 6 to the water treatment surface area is at least about 0.005, and no greater than about 0.05.

In the illustrated embodiment, the housing 6 includes an edge sealing member or gasket 34 arranged along the outer perimeter of the side wall 12. Arranged in this manner, when the water treatment cartridge 2 is installed in the water treatment device 2, the edge sealing member 34 engages the inner wall surface 36 (FIG. 3) of the water treatment device 4 to form a seal therewith.

As illustrated in FIGS. 3 and 4, the inner wall surface 36 of the water treatment device 4 includes a ledge 36a that extends inwardly from the wall surface 36. When the water treatment cartridge 2 is installed in the water treatment device 4, the water treatment cartridge 2 rests on the ledge 36a, and the edge sealing member 34 of the water treatment cartridge 2 forms a seal with the inner wall surface 36 of the water treatment device 4. In other embodiments, the water treatment cartridge 2 may be designed to snap-in place when it is installed in the water treatment device 4, or the water treatment device 4 and water treatment cartridge 2 may be designed such that the water treatment cartridge 2 can be simply pressed into the water treatment device 4 to the point where the water treatment cartridge 2 fits snuggly within the water treatment device 4 and the edge sealing member 34 forms a seal against the inner wall surface 36 of the water treatment device 4.

Other sealing member configurations and arrangements are contemplated. For example, the edge sealing member may be provided as a horizontal slot that runs through the circumference of the housing, wherein the slot is provided with a gasket made of a compliant material like silicone rubber. In this embodiment, the edge sealing member 34 will rest on the ledge 36a, and the compliant gasket will form a seal between the water treatment cartridge 2 and the water treatment device 4. Such an embodiment provides more leeway in the tolerances needed to provide an effective seal between the edge sealing member 34 and the inner wall surface 36 of the water treatment device 4, and simplifies the manufacturing process.

In another embodiment, the edge sealing member 34 may be provided along the perimeter of the bottom surface of the housing 6 of the water treatment cartridge 2. For example, the bottom surface may include an o-ring or a slot that runs along the circumference of the bottom of the housing 6, and the slot may be provided with a gasket made of a compliant material, such as silicone rubber. Arranged in this manner, the edge sealing member 34 will rest on the ledge 36a, and the compliant gasket will form a seal with the ledge 36a.

The inner wall surface 36 of the water treatment device 4 may further include projections (not shown) that serve to lock the water treatment cartridge 2 securely into place when the water treatment cartridge 2 is installed in the water treatment device 4. The projections may be provided at a location spaced from the ledge 36a so as to provide a mechanical lock when the water treatment cartridge 2 is installed in the water treatment device 4, and the water treatment cartridge 2 will press against the ledge 36a due to the tension provided by the contact points between the projections and the edge sealing member 34. Accordingly, the distance between the ledge 36a and the projections will be slightly larger than the dimension defined by the bottom surface of the housing 6 and the top edge of the edge sealing member 34.

In the embodiment illustrated in FIG. 3, the water treatment device 4 is a water pitcher. The water pitcher 4 includes a container 44 defining a reservoir 38. Referring to FIG. 4, which shows a water pitcher 4 with a water treatment cartridge 2 installed therein, the water treatment cartridge 2 separates the reservoir 38 into an untreated water containment reservoir 38a located above the water treatment cartridge 2, and a treated water containment reservoir 38b located below the water treatment cartridge 2. The untreated water containment reservoir 38a may be designed to hold, for example, no greater than about 1, no greater than about 2 or no greater than about 3 cups of untreated water, and the treated water containment reservoir 38b may be designed to hold, for example, at least about 6, at least about 8, at least about 10, at least about 12, or at least about 14 cups of treated water. Thus, in one aspect, the treated water containment reservoir 38b is at least about 2, at least about 4, at least about 6, at least about 8, at least about 10, at least about 12 or at least about 14 times the volume of the untreated water containment reservoir 38a.

To treat water using the water treatment device 4, untreated tap water 40a is directed into the top of the water treatment device 4 and into the untreated water containment reservoir 38a. The untreated tap water 40a then enters the water treatment cartridge 2. As the untreated tap water 40a passes through the water treatment cartridge 2, unwanted contaminants are removed. Treated water 40b exits the water treatment cartridge 2 and is collected in the treated water containment reservoir 38b. In the illustrated embodiment, the treated water may be dispensed from the water pitcher 4 by lifting the water pitcher 4 using the handle 46, and tilting the water pitcher 4 until the treated water pours from the spout 48. Although not illustrated, it will be recognized that in order for the treated water to be readily dispensed from the treated water containment reservoir 38b, the water treatment cartridge 2 does not obstruct the spout 48.

In the embodiment illustrated in FIG. 4, the water treatment cartridge 2 includes a handle 42 to facilitate the installation of the water treatment cartridge 2 into the water treatment device 4, and to facilitate removal of the water treatment cartridge 2 from the water treatment device 4. Generally, the flow rate of water through the water treatment cartridge 2 at a pressure head of ¾ inch (1.9 cm) of water is at least about 0.03 liters per minute (lpm) and no greater than about 5.0 lpm at a pressure head of 2 inches (5 cm) of water. In one embodiment, water treatment cartridge 2 passes NSF Standard 42 for a capacity of at least about 95 liters (25 gallons), at least about 114 liters (30 gallons), at least about 132 liters (35 gallons), at least about 151 liters (40 gallons), or at least about 302 liters (80 gallons). That is, the water treatment cartridge 2 is generally designed to treat at least this amount of water before it needs to be replaced.

In one embodiment, the water treatment cartridge 2 is configured to work with a separate tray or reservoir (not shown) that contains inlet and outlet openings. The inlet opening of the tray is configured to allow the water treatment cartridge 2 to be inserted, and fitted into, the tray. This may be accomplished, for example, using the ledge 36a and/or the projections described above. The outlet opening is designed to allow filtered water 40b to flow unimpeded into the treated water containment reservoir 38b. The separate tray/reservoir-cartridge combination can be designed as a single disposable unit, or it can be designed so the cartridge can be removed at end of its useful life, and a new replacement cartridge can be inserted into the tray, whereby the tray is reusable. Providing a tray with a separate reservoir provides for flexibility in that it allows for the design of water treatment devices 4 with different volumes of untreated water containment reservoirs with different pressure heads.

Persons of ordinary skill in the art may appreciate that various changes and modifications may be made to the embodiments described above without deviating from the inventive concept. For example, the water treatment cartridge may include a timer or end-of-life indicator. The timer or end-of-life indicator may be, for example, a time strip with a diffusive element where a dye diffuses as a function of time, an LCD or LED timer that counts down from a predetermined time interval, or an electronic or electrochemical sensing device that senses how much water has flowed through the cartridge. Thus, the scope of the present disclosure should not be limited to the structures described in this application, but only by the structures described by the language of the claims and the equivalents of those structures.

EXAMPLES

Example 1

A structural honeycomb material similar to Nida-CoreH11PP (available from 3M Company, St. Paul, Minn.) was used to prepare water treatment cartridge housings according to the invention. The material used was 11 millimeters (mm) thick with approximately 12 mm diameter cells. The material was die cut into a 6.032 inch by 2.832 inch oval (15.3 cm by 5.08 cm). A 34 grams per square meter (gsm) nylon spunbond scrim (available from Midwest Filtration, Cincinnati, Ohio) was then applied to one surface of the honeycomb structure and around the outer perimeter of the honeycomb structure using hot glue, to form a closed, bottom surface on the honeycomb structure. This established the compartments for holding the particulate carbon and ion exchange materials within the structure.

10 grams of activated carbon (Kuraray PGWH—150 MP, 80×325 mesh, available from Kuraray Chemical Company, Osaka, Japan) was combined with 23 grams of C107 ion exchange resin (300-1600 μm size range, available from Purolite, Bala Cynwyd, Pa.) and 68 grams of WACG-HP ion exchange resin (size range 16-50 mesh, available from ResinTech, Inc., West Berlin, N.J.). The materials were then placed into a plastic ZIPLOC bag and mixed by hand. 68 grams of the particle mixture was then used to fill the compartments of the honeycomb structure. The particulate material was generally evenly distributed amongst the compartments. Once the compartments were filled, hot glue was used to bond a 34 gsm scrim like the one described above to the open top surface and around the outer perimeter of the top surface of honeycomb structure to contain the particles within the structure and complete the assembly of the water treatment cartridge. The water treatment surface area of the cartridge was approximately 96 cm$^2$.

Hardness and chlorine reduction measurements were carried out using test water conditioned to 2 ppm chlorine and approximately 100 ppm hardness. Chlorinated water was prepared by using chlorine bleach to adjust to a chlorine level of 2 ppm. The chlorinated water was then used to prepare hard water solutions. The hardness levels were adjusted using $CaCl_2$ and $MgSO_4$ in a 4:3 weight ratio. Care was taken to ensure that the solution contained less than 38.5 grams/liter $CaCl_2$ and less than 20.9 grams/liter $MgSO_4$. The assembled water treatment cartridges were tested by passing up to 50 gallons (189.27 liters) of the test water through them in 0.5 gallon (1.89 liter increments). The tests were carried out over a 25 day period. 2 gallons (7.57 liters) of test water were passed through a given water treatment cartridge each day to represent routine use of the cartridge. Chlorine levels of both the influent (poured in) water and effluent (filtered) water were measured by a colorimetric procedure using a Hach Pocket Colorimeter II Test Kit with SwifTest DPD Free Chlorine Reagent Dispener (available from Hach Company, Loveland, Colo.). The procedure for this test was a modified version of the Standard Method 4500-Cl G for drinking water. 10 ml of the water to be tested was placed in one of the test vials supplied with the kit and the outside of the vial was wiped with a paper towel to remove all fingerprints etc. The vial was then placed in the colorimeter and the instrument was blanked to set the zero point. The vial was then opened, and the SwifTest Dispenser was used to dispense one drop of reagent into the vial. The vial was then capped and vigorously shaken for 3 seconds, wiped again, and then placed in the colorimeter. The chlorine level was then recorded from the readout display on the colorimeter.

The hardness levels of both the influent and effluent were evaluated using a titrimetric procedure. Water Hardness Buffer, APHA (odorless), (No. 9205-16 or equivalent, available from Fisher Scientific) was added drop wise to the sample water until the pH was about 10.1. Calmagite Indicator, 1 ml of a 0.1% (w/v) Aqueous Solution, (Ricca Chemical, No. 1830-16 or equivalent, available from Fisher Scientific) was then added to the test solution to provide a medium wine red color. EDTA Titrant (0.0100 Molar) (Ricca Chemical, No. 2700-32 or equivalent, available from Fisher Scientific) was then added drop wise to the solution until the color of the solution turned from wine red to royal blue. The hardness of the solution was determined from the relationship:

$$\text{Hardness(in ppm)} = V*1.035104*1000/70$$

where V is the volume (ml) of EDTA titrant used. The results are summarized in Table 1.

TABLE 1

| Liters of Test Water | Chlorine Level | | | Hardness Level | | | Flow Rate (lpm) |
|---|---|---|---|---|---|---|---|
| | Influent (ppm) | Effluent (ppm) | % Reduction | Influent (ppm) | Effluent (ppm) | % Reduction | |
| 3.79 | 2.20 | 0.03 | 98.6 | 90.2 | 8.90 | 90.2 | 0.76 |
| 18.93 | 1.97 | 0.05 | 97.6 | 88.7 | 16.3 | 81.7 | 0.68 |
| 37.85 | 1.95 | 0.07 | 96.4 | 87.2 | 35.5 | 59.3 | 0.76 |
| 75.71 | 2.08 | 0.12 | 94.2 | 87.2 | 50.3 | 42.4 | 0.68 |
| 113.56 | 1.80 | 0.25 | 86.1 | 79.1 | 54.0 | 31.8 | 0.79 |
| 151.42 | 1.98 | 0.32 | 83.8 | 95.3 | 66.5 | 30.2 | 0.79 |
| 189.27 | 1.87 | 0.23 | 87.7 | 84.2 | 62.8 | 25.4 | 0.76 |

Example 2 and Competitive Examples 1-3

An additional water treatment cartridge was prepared using the same particulate materials and compositions as described for Example 1 above. The water treatment cartridge was tested for chlorine reduction, hardness reduction and flow rate as described above. Competitive water treatment cartridges that are used in water pitchers presently available in the marketplace were also tested for comparison. Results are summarized in Tables 2, 3 and 4.

The competitive water treatment cartridges that were tested were a BRITA cartridge (Competitive Example 1), available at on-line retailers and at many retail stores in the United States, a MAVEA MAXTRA cartridge sold in Europe (Competitive Example 2), and a MAVEA MAXTRA cartridge sold in the United States, (for example, Model 1001122, available from MAVEA LLC, Elgin, Ill.) (Competitive Example 3). MAVEA is a subsidiary of BRITA GmbH, Germany, and BRITA water pitchers and cartridges are sold in the United States by Clorox under license from BRITA GmbH. These products were chosen to represent the market leading products with two significantly different form factors, and they were tested in their intended configuration. The BRITA water treatment cartridge was tested using a BRITA water pitcher. The MAVEA MAXTRA cartridges were tested using a MAVEA Elemaris XL Water Pitcher Model 1001125. The Example 2 water treatment cartridge was tested using a FILTRETE 8-Cup Water Pitcher (available from 3M Company, St. Paul, Minn.).

Due to the different sizes and configurations of the upper loading reservoir (untreated water containment reservoir) of the different water pitchers, the pitchers were filled with the 0.5 gallon (1.89 liter) aliquots of influent water maintaining the maximum possible pressure head until all the aliquot was introduced into the loading reservoir, after which the water was allowed to be filtered until all of it had passed through the water treatment cartridges and into the lower treated water containment reservoir. Flow rates were measured by timing the total time it took for 0.5 gallon (1.89 liter) of water to flow through and completely drain into the containment reservoir. Results are summarized in Tables 2, 3 and 4.

TABLE 2

Chlorine Level

| Liters of Test Water | Example 2 | | | Competitive Example 1 | | | Competitive Example 2 | | | Competitive Example 3 | | |
|---|---|---|---|---|---|---|---|---|---|---|---|---|
| | Influent (ppm) | Effluent (ppm) | % Reduction | Influent (ppm) | Effluent (ppm) | % Reduction | Influent (ppm) | Effluent (ppm) | % Reduction | Influent (ppm) | Effluent (ppm) | % Reduction |
| 3.79 | 2.20 | 0.03 | 98.6 | 2.13 | 0.04 | 98.1 | 2.17 | 0.03 | 98.6 | 2.17 | 0.04 | 98.2 |
| 18.93 | 1.97 | 0.05 | 97.5 | 2.07 | 0.11 | 94.7 | 2.18 | 0.18 | 91.7 | 2.18 | 0.02 | 99.1 |
| 37.85 | 1.95 | 0.07 | 96.4 | 1.99 | 0.18 | 91.0 | 2.04 | 0.17 | 91.7 | 2.04 | 0.02 | 99.0 |
| 75.71 | 2.08 | 0.12 | 94.2 | 2.02 | 0.07 | 96.5 | 2.16 | 0.42 | 80.6 | 2.16 | 0.20 | 90.7 |
| 113.56 | 1.80 | 0.25 | 86.1 | 2.2 | 0.05 | 97.7 | 1.93 | 0.42 | 78.2 | 2.2 | 0.06 | 97.3 |
| 151.42 | 1.98 | 0.32 | 83.8 | 2.05 | 0.11 | 94.6 | 1.81 | 0.29 | 84.0 | 1.81 | 0.07 | 92.3 |
| 189.27 | 1.87 | 0.23 | 87.7 | 2.04 | 0.11 | 94.6 | 1.80 | 0.43 | 76.1 | 1.80 | 0.12 | 93.3 |

TABLE 3

Hardness Level

| Liters of Test Water | Example 2 | | | Competitive Example 1 | | | Competitive Example 2 | | | Competitive Example 3 | | |
|---|---|---|---|---|---|---|---|---|---|---|---|---|
| | Influent (ppm) | Effluent (ppm) | % Reduction | Influent (ppm) | Effluent (ppm) | % Reduction | Influent (ppm) | Effluent (ppm) | % Reduction | Influent (ppm) | Effluent (ppm) | % Reduction |
| 3.79 | 90.20 | 8.9 | 90.2 | 128.64 | 17.74 | 86.2 | 87.24 | 5.9 | 93.2 | 87.24 | 7.4 | 89.7 |
| 18.93 | 88.72 | 16.3 | 81.7 | 128.64 | 32.53 | 74.7 | 85.03 | 13.9 | 83.7 | 85.03 | 21.4 | 74.8 |
| 37.85 | 87.24 | 35.5 | 59.3 | 119.76 | 62.11 | 48.1 | 106.47 | 50.3 | 52.8 | 106.47 | 58.4 | 45.1 |
| 75.71 | 87.24 | 50.3 | 42.4 | 99.81 | 56.93 | 43.0 | 90.70 | 45.1 | 50.3 | 90.7 | 54.7 | 39.7 |
| 113.56 | 79.11 | 54.0 | 31.8 | 90.20 | 57.67 | 36.1 | 99.07 | 63.6 | 35.8 | 99.07 | 72.5 | 26.9 |
| 151.42 | 95.38 | 66.5 | 30.2 | 87.24 | 59.15 | 32.2 | 78.37 | 50.3 | 35.8 | 78.37 | 54.7 | 30.2 |
| 189.27 | 84.29 | 62.8 | 25.4 | 85.77 | 60.63 | 29.3 | 95.38 | 64.3 | 32.6 | 95.38 | 68.8 | 27.9 |

TABLE 4

Flow Rate (liters per minute)

| Liters of Test Water | Example 2 | Competitive Example 1 | Competitive Example 2 | Competitive Example 3 |
|---|---|---|---|---|
| 3.79 | 0.76 | 0.34 | 0.19 | 0.23 |
| 18.93 | 0.68 | 0.26 | 0.23 | 0.19 |
| 37.85 | 0.76 | 0.26 | 0.26 | 0.19 |
| 75.71 | 0.68 | 0.23 | 0.23 | 0.15 |
| 113.56 | 0.79 | 0.19 | 0.26 | 0.23 |
| 151.42 | 0.79 | 0.15 | 0.19 | 0.19 |
| 189.27 | 0.76 | 0.15 | 0.23 | 0.15 |

The results show that the invention water treatment cartridge provides similar or better water filtration performance (chlorine reduction and hardness reduction) compared to the competitive water treatment cartridges while providing increased flow rates when tested in their intended configuration.

What is claimed is:

1. A manually-operated gravity-flow water treatment cartridge for use in a portable water treatment device having a filtered water reservoir, the water treatment cartridge comprising:
   (a) a housing comprising a framework defining a plurality of compartments, wherein the housing is configured for removable arrangement in the water treatment device;
   (b) solid particulate water treatment media loosely arranged in each of the compartments;
   (c) a media retaining member extending across an end of the framework for retaining the solid particulate media within the housing;
   (d) a flow regulating member arranged over the media retaining member, the flow regulating member being a fibrous meltblown nonwoven polymeric web, and wherein the flow regulating member restricts the flow of water through the solid particulate water treatment media thereby increasing the amount of time the water is in contact with the solid particulate water treatment media and the flow rate of water through the water treatment cartridge at a pressure head of ¾ inch (1.9 cm) of water is at least about 0.03 liters per minute (lpm) and no greater than about 5.0 lpm at a pressure head of 2 inches (5.1 cm) of water.

2. The water treatment cartridge of claim 1, wherein the housing further comprises a side wall extending around a perimeter of the framework, whereby water readily flows through the media retaining member, and whereby the water treatment media is retained within the compartments by the media retaining member.

3. The water treatment cartridge of claim 2, wherein the housing includes an inlet side and an outlet side, and wherein the regulating member is arranged adjacent at least one of the inlet and outlet.

4. The water treatment cartridge of claim 3, wherein the inlet side of the housing has a water treatment surface area of at least about 20 cm² and no greater than about 250 cm².

5. The water treatment cartridge of claim 4, wherein the distance from the inlet side of the housing to the outlet side of the housing defines a flow path, and wherein the flow path is at least about 0.65 cm and no greater than about 5 cm.

6. The water treatment cartridge of claim 5, wherein each compartment has a volume of at least about 0.25 cm³ and no greater than about 10 cm³.

7. The water treatment cartridge of claim 6, wherein the housing has a thickness to cross-sectional area ratio of at least about 0.005 and no greater than about 0.05.

8. The water treatment cartridge of claim 1, wherein the flow regulating member restricts the flow of water through the water treatment media to no greater than about 2 liters per minute per 100 square centimeters (2 lpm/100 cm²) of water treatment surface area.

9. The water treatment cartridge of claim 1, wherein the fibrous meltblown nonwoven material polymeric web comprises activated carbon particles enmeshed therein.

10. The water treatment cartridge of claim 1, having a capacity of at least about 302 liters (80 gallons).

11. The water treatment cartridge of claim 1, wherein the solid particulate water treatment media comprises a combination of ion exchange resin and activated carbon water treatment media.

12. The water treatment cartridge of claim 11, wherein the activated carbon has an average particle size of at least about 30 μm and no greater than about 800 μm.

13. The water treatment cartridge of claim 11, wherein each compartment contains less than about 80% water treatment media by volume when the water treatment media is in its dry condition, thereby allowing the ion exchange resin to expand in water.

14. The water treatment cartridge of claim 1, wherein the housing is formed of an injection molded thermoplastic polymer.

15. The water treatment cartridge of claim 1, wherein each compartment has a hexagonal cross-sectional shape, thereby forming a honeycomb shaped structure.

16. The water treatment cartridge of claim 1 further comprising an edge sealing member extending on the side wall and configured to form a seal with an interior wall surface of the portable container.

17. A water treatment cartridge, comprising:
(a) a housing containing a plurality of compartments, wherein each compartment contains solid particulate water treatment media,
(b) a flow regulating member arranged to restrict the flow of water through the water treatment media, the flow regulating member being a fibrous meltblown nonwoven polymeric web, and wherein the flow regulating member restricts the flow of water through the solid particulate water treatment media thereby increasing the amount of time the water is in contact with the solid particulate water treatment media and the flow rate of water through the water treatment cartridge at a pressure head of ¾ inch (1.9 cm) of water is at least about 0.03 liters per minute (lpm) and no greater than about 5.0 lpm at a pressure head of 2 inches (5.1 cm) of water; and
(c) an edge sealing member extending on the side wall and configured to form a seal with an interior wall surface of the portable container.

18. A water treatment device, comprising:
(a) a portable container defining a reservoir;
(b) a water treatment cartridge configured for removable arrangement in the reservoir, wherein the water treatment cartridge comprises a housing comprising a framework defining a plurality of compartments, a side wall extending around the perimeter of the framework, and an edge sealing member extending on the side wall and configured to form a seal with an interior wall surface of the portable container;
(c) solid particulate water treatment media comprising at least activated carbon and ion exchange resin loosely arranged in each of the compartments;
(d) an open scrim arranged adjacent opposite sides of the framework for retaining the sold particulate media within the housing; and
(e) a flow regulating member being a nonwoven polymeric web, the flow regulating member arranged over the open scrim, and wherein the flow regulating member restricts the flow of water through the solid particulate water treatment media thereby increasing the amount of time the water is in contact with the solid particulate water treatment media and the flow rate of water through the water treatment cartridge at a pressure head of ¾ inch (1.9 cm) of water is at least about 0.03 liters per minute (lpm) and no greater than about 5.0 lpm at a pressure head of 2 inches (5.1 cm) of water.

* * * * *

UNITED STATES PATENT AND TRADEMARK OFFICE
CERTIFICATE OF CORRECTION

PATENT NO. : 9,028,690 B2  
APPLICATION NO. : 13/450247  
DATED : May 12, 2015  
INVENTOR(S) : Stephen Sanocki Page 1 of 1

It is certified that error appears in the above-identified patent and that said Letters Patent is hereby corrected as shown below:

In The Specification

Column 5  
Line 47, delete "matter," and insert -- matter. --, therefor.

Column 7  
Lines 8-9, before "nonwoven" insert -- meltblown polymeric --.  
Lines 14-15, delete "meltblown polymeric nonwoven" and insert -- nonwoven --, therefor.

Column 11  
Line 42, delete "Dispener" and insert -- Dispenser --, therefor.

In The Claims

Column 15  
Line 2, in Claim 9, delete "nonwoven material" and insert -- nonwoven --, therefor.

Signed and Sealed this  
Third Day of May, 2016

Michelle K. Lee  
*Director of the United States Patent and Trademark Office*